United States Patent [19] [11] 3,964,846
Bliss [45] June 22, 1976

[54] APPARATUS FOR MANUFACTURE OF POWER TRANSMISSION BELTS

[75] Inventor: Robert H. Bliss, Denver, Colo.

[73] Assignee: The Gates Rubber Company, Denver, Colo.

[22] Filed: May 7, 1973

[21] Appl. No.: 357,766

Related U.S. Application Data

[62] Division of Ser. No. 95,171, Dec. 4, 1970, abandoned.

[52] U.S. Cl. .................................. 425/28 B; 249/65; 425/DIG. 19

[51] Int. Cl. ........................ B29d 29/00; B29c 17/00; B29h 7/22

[58] Field of Search .................. 425/28 B, 34 B, 29, 425/30, 35, 40, 43, 84, DIG. 19; 249/65

[56] References Cited

UNITED STATES PATENTS

| | | | |
|---|---|---|---|
| 2,253,792 | 8/1941 | Leavenworth | 425/28 B |
| 2,565,949 | 8/1951 | Clifford et al. | 425/DIG. 19 |
| 2,573,643 | 10/1951 | Hurry | 425/34 B |
| 2,599,046 | 6/1952 | Brucker | 425/34 B; |
| 2,600,775 | 6/1952 | Hurry et al. | 425/34 B X |
| 2,671,244 | 3/1954 | Friedlander | 425/28 B |
| 2,730,783 | 1/1956 | Kennison | 425/84 |
| 2,865,078 | 12/1958 | Hasselblad | 425/DIG. 19 |
| 2,883,701 | 4/1959 | Sauer | 425/34 B |
| 3,056,183 | 10/1962 | Pigeot | 425/DIG. 19 |

*Primary Examiner*—J. Howard Flint, Jr.
*Attorney, Agent, or Firm*—H. W. Oberg, Jr.; Raymond Fink; Curtis H. Castleman, Jr.

[57] ABSTRACT

An apparatus for making transmission belts by assembling a belt sleeve or belt body in the conventional manner and placing them in a vulcanizing chamber. The belt body or sleeve is sandwiched between radially expansible and radially contractable members of the vulanizing chamber. Outward radial pressure is first applied to the belt body or sleeve and then a radial inward pressure is applied. Heat is simultaneously added to cure the body or sleeve.

3 Claims, 2 Drawing Figures

10 30 22 62 24 64 48 82 84 68 70 76 86 88 66 28 26 30 62 12 78 80 72 32 30 18 62 14 54 50 56 16 40 48 42 38 36 46 60 52 58 44 74 62 34 30 20

APPARATUS FOR MANUFACTURE OF POWER TRANSMISSION BELTS

This is a division of application Ser. No. 95,171 filed on Dec. 4, 1970, and now abandoned.

BACKGROUND OF THE INVENTION

The invention relates to apparatus for manufacturing power transmission belts, but more particularly, the invention relates to apparatus for curing or vulcanizing of such belts.

It is normal practice to build a belt sleeve by plying together superimposed layers of various materials. The belt sleeve includes a first layer of uncured rubber over which is placed a tensile reinforcement of spirally wound cord. A second uncured rubber layer is superimposed over the cord. The belt sleeve is then cured under heat and pressure.

Various methods and apparatus have been devised which devote special attention to the tension section during curing or vulcanization. One such method is taught by U.S. Pat. No. 2,573,642 as issued to Hurry. Another method and apparatus that gives attention to the tension section, is taught by U.S. Pat. No. 3,398,218 as issued to Richmond. Both Hurry and Richmond teach methods for curing belts which have a tensile reinforcement that is variable in length. Under the Hurry method, the tensile reinforcement is stretched as the rubber layers are pressured into the mold. Under the Richmond method, a radially inward differential pressure is first applied to a belt body which somewhat compresses the tension section. Then an outward radial pressure is applied against the belt body as a blowing agent disposed within a rubber material expands.

It has been found that these and similar methods are satisfactory for manufacturing power transmission belts having customary tensile reinforcement which may be either stretched or shrunk tolerable amounts. Tensile reinforcements falling within this category include cotton, rayon, nylon and polyester. But in recent years, industry has created a demand for power transmission belts or higher power transmission capability. The demand established the need for a stronger or higher modulus tensile reinforcement. However, known tensile reinforcements of higher modulus, such as fiber glass and steel, are relatively inextensible and unshrinkable. Another high modulus reinforcement is an aromatic-polyamide sold under the trademark Nomex by DuPont. The unextensible properties of such reinforcements prevents proper curing pressure to be applied to both rubber layers of the belt sleeve during curing or vulcanizing by known methods. For manufacturing reasons, fiber glass cord is preferred over steel cord. However, fiber glass must be carefully handled because it is severely damaged if compressed. Compression loading of the tensile reinforcement is inherent in some known belt sleeve curing methods such as Richmond.

SUMMARY OF THE INVENTION

In accordance with the invention, it has been found that high modulus tensile reinforcements may be successfully used when special consideration is given when applying pressure to the belt sleeve or belt body during curing. Pressure must be individually applied to both rubber layers of the belt sleeve or body while simultaneously keeping the tensile reinforcement under tension. When a fiber glass tensile reinforcement is used, it is extremely important that the reinforcement never be subjected to a compressive load. To accomplish the desired pressure control, a mold having inner and outer plyable walls is used. An outward radial pressure is applied to the belt body or belt sleeve by a first plyable wall of the curing chamber. Afterwards, a lessor inward radial pressure is applied to the belt body or belt sleeve by means of a second plyable wall member while simultaneously applying heat in sufficient quantity to cure the rubber layers of the belt sleeve.

It is therefore a principle object of the invention to provide an apparatus for manufacturing power transmission belts which have a substantially inextensible tensile reinforcements.

It is another object of the invention to provide an apparatus for curing power transmission belt sleeves by controlling differential pressure as applied to the first and second rubber layers of the belt sleeve.

Another object of the invention is to provide an apparatus for curing power transmission belts having fiber glass tensile reinforcements whereby the possibility of compressing and damaging the fiber glass is avoided.

Yet another object of the invention is to provide an apparatus for making an improved power transmission belt having a fiber glass tensile reinforcement.

Still another object of the invention is to provide an apparatus for curing power transmisstion belts to attain good adhesion between the rubber layers of the belt and an essentially inextensible tensile reinforcement sandwiched therebetween.

It is another object of the invention to provide a means for applying sequenced inward and outward radial pressure to a belt sleeve during curing thereof.

A further object of the invention is to provide an apparatus to accomplish the above objects.

These and further objects and advantages of the invention will become apparent upon review of the drawings and description thereof wherein.

DESCRIPTION OF PREFERRED EMBODIMENT

Figures 1, 2:
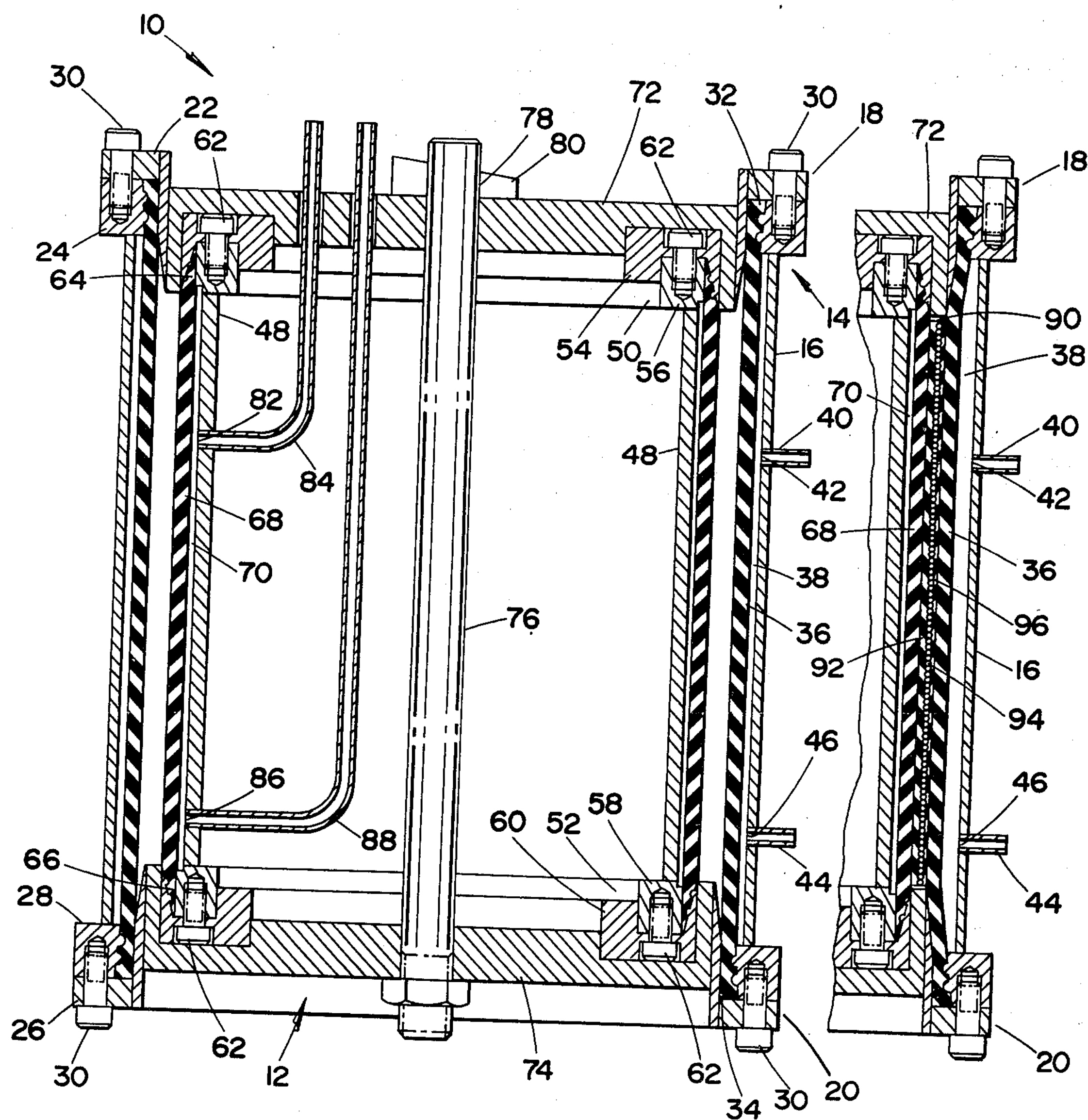
FIG. 1 is a sectional side view of the apparatus.
FIG. 2 is a partial view of FIG. 1 illustrating the relationship between pressure regulating members of the apparatus and a belt sleeve.

Referring to the drawings, a curing mold 10 of preferably cylindrical shape is provided. The mold 10 includes inner 12 and outer 14 cylindrical assemblies that are essentially concentric. The outer assembly 14 includes a supporting outer cylinder 16. Upper 18 and lower 20 end rings are attached to each end of the outer cylindar 16. The lower end ring forms a base for the mold. Each end ring is made of two separate concentric rings, 22–24, 26–28 that are held together by fasteners 30. The rings define upper 32 and lower 34 annular grooves. The upper ring 18 is coaxial with the lower ring 20. Together, the rings 18 and 20 define a guide which concentrically aligns and receives the inner assembly 12. A heavy rubber type diaphragm 36 or bladder of cylindrical shape is mounted between the upper 18 and lower 20 end rings. The bladder 36 extends into the upper 32 and lower 34 annular grooves and seals with the end rings. The bladder 36, end rings 18 and 20 and outer cylinder 16 define a sealed low-pressure heat chamber 38 of variable volume. A conduit 40 is attached to the outer cylinder 16 over an aperture 42. The conduit 40 directs heat and pressure to the low-pressure chamber 38 from an external source. Preferably, a second conduit 44 is attached to the outer cylinder 16 over a second aperture 46, the purpose of which will be later explained.

The inner assembly 12 is similar to the outer assembly in many respects. The inner assembly 12 includes a supporting inner cylinder 48. Upper 50 and lower 52 coaxial end rings are attached to each end of the inner cylinder 48. Each inner ring includes two separate concentric rings, 54–56, 58–60, that are held together by fasteners 62. The concentric rings define upper and lower annular grooves 64 and 66. A heavy rubber type inner diaphragm 68 or bladder of cylindrical shape is mounted between the upper 50 and lower 52 end rings. The bladder 68 extends into the annular grooves 64 and 66 and is held in place by the fasteners 62. The inner bladder 68, end rings 50 and 52 and inner cylinder 48 define a sealed high-pressure heat chamber 70 of variable volume. Upper 72 and lower 74 end caps slip over the upper 50 and lower 52 end rings respectively. The end caps are secured to the assembly by means of a bar 76 which attaches to the lower end cap 74 and extends through the upper end cap 72. The bar 76 has a hole or slot 78 near the upper end cap, through which is fitted a wedge or drift pin 80. The wedging action of the drift pin tensions the bar 76 and holds the end caps 72 and 74 firmly in place. The outside diameters of the end caps 72 and 74 are slightly less than the inside diameter of outer concentric rings 18 and 20. The close diameters of the end caps 72 and 74 and outer end rings 18 and 20 facilitate concentric alignment between the inner 12 and outer 14 assemblies. The inner cylinder 48 is provided with a hole 82 for receiving one end of a conduit 84. The conduit 84 directs heat and pressure to the high-pressure chamber from an external supply source. Preferably, a second hole 86 is located in the inner cylinder 48 for receiving an end of a second conduit 88.

Power transmission belts to be cured with apparatus of the invention are first built up in the usual manner as a belt sleeve. The belt sleeve typically includes a first rubber layer, a spirally wound tensile cord, and a second rubber layer. The axial length of the belt sleeve should be slightly less than the axial distance between the upper and lower end caps. The inside diameter of the belt sleeve should be slightly larger than the outside diameter of the upper ring 54 of the inner assembly 12. The pitch diameter of the tensile cord varies approximately five percent in an uncured belt sleeve because of normal manufacturing tolerances. The variation results from allowable tolerances for a belt building drum, mold and the thickness of the rubber layers. Prior art methods of curing belt sleeves accommodate the tolerance build-up by shrinking or stretching the tensile cord to either a larger or smaller pitch diameter. This invention is primarily directed toward curing belts having essentially non-extensible tensile cords such as metal, Nomex and especially fiber glass. Fiber glass is essentially non-extensible and it is severely weakened if subjected to compressive forces.

To cure a belt sleeve in accordance with the invention, the inner assembly 12 is first removed from the mold. The drift pin 78 is removed which permits dismantling of the upper end cap 72. A belt sleeve or body 90 may then be positioned over the inner diaphragm or bladder 68. The upper end cap 72 and drift pin 78 are replaced and the inner assembly 12 is repositioned in the mold. Heat and pressure are directed to the high pressure chamber by means of the inner conduit 84. Preferably, the heat and pressure source is steam. Normally, steam at 170 psig and 375° Fahrenheit is supplied for average size belt sleeves. Steam condensate is removed from the high pressure chamber 38 by means of the second conduit 88. The pressure expands the inner diaphragm 68 and exerts outward radial pressure against the belt sleeve 90. The belt sleeve or body inward 92 of the tensile reinforcement 94 is compressed which tensions the tensile reinforcement or cords 94. Further expansion of the inner-bladder 68 is restrained by the tensile reinforcement 94. Here, it should be noted that inner-diaphragm 68 adjusts to the free pitch circumference of the tensile renforcement 94 to accommodate dimensional variations as induced in manufacturing the uncured belt sleeve 90.

Outward radial pressure on the belt sleeve 90 compresses the inner rubber layer 92 and tensions the reinforcement 94. Compressive forces are not transmitted to the outside rubber layer 96 at this time because of the non-extensibility of the tensile or cord reinforcement 94. The portion of the belt sleeve outward 96 of the tensile reinforcement 94 must be compressed to insure proper adhesion with the tensile reinforcement 94. After a time delay of approximately one-half minute, steam at 140 psig and 360° Fahrenheit is directed through the outer conduit 40 to the low pressure chamber 38. The time delay insures a positive pressure differential between the inner 70 and outer 38 chambers during the pressure transients. The pressure contracts the outer diaphragm 36 radially inward which in turn compresses the outer rubber layer 96 radially inward against tensile reinforcement 94. Steam condensate is removed from the low-pressure chamber by means of the second conduit 46. Thus, a differential pressure of approximately 30 pounds per square inch is maintained radially outward across the belt sleeve to insure positive tensioning of the cord reinforcement 94 during curing of the rubber layers. When the curing cycle is completed, heat and pressure to the low-pressure chamber 38 is terminated. After a time delay, heat and pressure to the high-pressure chamber 70 is terminated. The pressure delay sequence is desirable when manufacturing belts with fiber glass tensile cords because it insures a positive pressure differential for tensioning the cords during the pressure decay transient. The cured belt sleeve is then removed from the mold for cutting into separate power transmission belts of desired cross section.

The time required to cure a belt sleeve is dependent upon the type of rubber material being cured, the mass of the rubber material and the curing temperature. In general, the curing cycle is completed when the mass of material has been heated between 15 and 90 minutes. When considering the time required to cure the belt sleeve, the heat transfer characteristics of the bladders 36 and 68 must be considered. Heat must be transferred across the bladders 36 and 68 to the belt sleeve. Characteristically, the elastomeric bladders cannot conduct heat as rapidly as a metal. A time delay factor to transfer heat across the bladders must be added to the cure cycle. It has been found that it takes approximately 10 minutes to transfer the necessary heat across an elastomeric bladder 0.28 inch thick.

The upper 72 and lower 74 end caps being of metal have a higher heat capacity than the bladders. Under some plant manufacturing conditions, for example, low surrounding temperatures, the end caps may drain heat near the belt sleeve ends faster than heat can be supplied across the bladders. In such a situation, the ends of the belt sleeve would not be usable as they would be under-cured. Optionally, the entire mold may be placed in an autoclave and the autoclave may then be heated. The pressure within the autoclave must be maintained at a level lower than the pressure of the high 70 and low 38 pressure chambers. Otherwise, a proper pressure differential could not be maintained across the belt sleeve.

For comparative purposes, belts having generally non-extensible reinforcements were constructed and cured by standard methods and by the method in accordance with the invention. Belts made by the older method of shell mold curing displayed different failure patterns. Belts made with only the portion of the rubber layer radially inward of the tensile reinforcement under pressure during the curing cycle failed early. Belts having a fiber glass reinforcement which were subjected to even slight compressive forces also failed early.

Care was taken to construct an uncured belt sleeve to exacting tolerances for curing in a typical shell mold. In shell mold curing, one side of the belt sleeve is in contact with a metallic cylindrical surface and the other side is in contact with an elastomeric bladder. The belt sleeve was built for a "glove" fit into the shell mold in effort to insure that some compression would be maintained on the belt sleeve on either side of the reinforcement. In an accelerated test, belts of the shell mold cure technique displayed a mean operating life of 173 hours. Belts of the same type were built and cured in accordance with the method of the invention. Under the same accelerated test, belts of the invention displayed a mean operating life of 308 hours or in other words, an improvement of 78 percent. It is readily seen that belts made by the method of the invention are superior to those belts of the same construction, but which were cured by other methods. The superior belt is a product of the method of the invention and not due to the physical details of belt construction.

The above method and apparatus may also be used for curing power transmission belts having an extensible reinforcement although the invention has been primarily described in relation to belts having non-extensible tensile cords.

The foregoing detailed description was made for purpose of illustration only and is not intended to limit the scope of the invention which is to be determined from the appended claims.

What is claimed is:

1. An apparatus for molding a power transmission belt sleeve having a tensile reinforcement disposed therein, comprising:

an inner cylindrically continuous flexible diaphragm that defines an inner mold surface;

an outer cylindrically continuous diaphragm that defines an outer mole surface, the inner and outer diaphragms radially spaced from and substantially concentric with each other for sandwiching the belt sleeve;

first pressure means for radially expanding the inner diaphragm out against the belt sleeve and applying outward radial pressure to mold that portion of the belt sleeve inward of the tensile reinforcement while tensioning the reinforcement;

second pressure means for radially contracting the outer diaphragm against the belt sleeve and applying inward radial pressure to mold that portion of the belt sleeve outward of the tensile reinforcement; and means for controlling pressure of the first and second pressure means for maintaining pressure of the first pressure means greater than the pressure of the second pressure means for maintaining tension reinforcement.

2. The apparatus of claim 1 and further including means for applying heat to the inner and outer diaphragms for curing the belt sleeve.

3. An apparatus for molding a power transmission belt sleeve comprising:

an inner cylinder;

an inner diaphragm spaced and disposed radially outwardly of the inner cylinder, the ends of the inner diaphragm sealed to the inner cylinder and the sealed space therebetween defining a high pressure heat chamber of variable volume;

an outer cylinder spaced and disposed radially outwardly of the inner diaphragm;

an outer diaphragm spaced and disposed radially inwardly of the outer cylinder and radially outwardly of the inner diaphragm, the ends of the outer diaphragm sealed to the outer cylinder and the sealed space therebetween defining a low pressure heat chamber of variable volume, and the space between the inner and outer diaphragms for receiving the belt sleeve;

means for directing heat and pressure to the high pressure chamber to radially expand the inner diaphragm;

means for directing heat and lesser pressure to the low pressure chamber to radially contract the outer diaphragm.

* * * * *